(12) United States Patent
Sinha et al.

(10) Patent No.: US 12,346,888 B2
(45) Date of Patent: *Jul. 1, 2025

(54) PAYMENT TRANSACTIONS USING AN AUGMENTED REALITY DEVICE

(71) Applicant: PayPal, Inc., San Jose, CA (US)

(72) Inventors: Mudit Sinha, Chennai (IN);
Pradeepkumar Sampathkumar, Chennai (IN)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,654

(22) Filed: Sep. 27, 2023

(65) Prior Publication Data

US 2024/0095699 A1 Mar. 21, 2024

Related U.S. Application Data

(63) Continuation of application No. 17/348,696, filed on Jun. 15, 2021, now Pat. No. 11,816,648, which is a
(Continued)

(51) Int. Cl.
*G06Q 30/00* (2023.01)
*G06F 3/01* (2006.01)
(Continued)

(52) U.S. Cl.
CPC ............ *G06Q 20/12* (2013.01); *G06F 3/011* (2013.01); *G06F 3/017* (2013.01);
(Continued)

(58) Field of Classification Search
CPC .... G06Q 20/12; G06Q 20/326; G06Q 20/321; G06Q 20/40145; G06Q 30/0643;
(Continued)

(56) References Cited

U.S. PATENT DOCUMENTS 9,985,786 B1 5/2018 Bhabbur et al.
10,025,486 B2 * 7/2018 Fein .................. G06F 3/017
(Continued)

OTHER PUBLICATIONS

Dialog., "The Next Big Thing?: Smartphone Payments are Still Waiting to Take Off, but Momentum is Building," The Burlington Free Press, Oct. 30, 2017, 2 pages.

*Primary Examiner* — Robert M Pond
(74) *Attorney, Agent, or Firm* — Kowert, Hood, Munyon, Rankin & Goetzel, P.C.; Catherine L. Gerhardt; Dean M. Munyon (57) ABSTRACT

A system and method of performing a payment transaction in an augmented user experience displayed to a user of an augmented reality device. The system includes receiving a request for user authentication from a user, authenticating the user for performing payment transactions via a merchant application executed on the augmented reality device, receiving a request for payment to a merchant for an item offered for sale to the user in an augmented environment presented by the merchant application, processing payment in the payment amount between a payment account of the user and a merchant account, wherein the request for payment is performed without the user exiting the merchant application.

20 Claims, 10 Drawing Sheets

Related U.S. Application Data continuation of application No. 15/858,851, filed on Dec. 29, 2017, now Pat. No. 11,037,116.

(51) Int. Cl.
  *G06F 3/04815* (2022.01)
  *G06Q 20/12* (2012.01)
  *G06Q 20/32* (2012.01)
  *G06Q 20/40* (2012.01)
  *G06Q 30/0601* (2023.01)
  *G02B 27/01* (2006.01)
  *G06F 3/04842* (2022.01)

(52) U.S. Cl.
  CPC ....... *G06F 3/04815* (2013.01); *G06Q 20/321* (2020.05); *G06Q 20/326* (2020.05); *G06Q 20/40145* (2013.01); *G06Q 30/0643* (2013.01); *G02B 2027/0138* (2013.01); *G02B 27/0172* (2013.01); *G02B 2027/0178* (2013.01); *G06F 3/04842* (2013.01)

(58) Field of Classification Search
  CPC ...... G06F 3/011; G06F 3/017; G06F 3/04815; G06F 3/04842; G02B 27/0172; G02B 2027/0138; G02B 2027/0178
  USPC ...................................... 705/26, 27
  See application file for complete search history.

(56) References Cited

U.S. PATENT DOCUMENTS

| | | |
|---|---|---|
| 10,095,929 B1 | 10/2018 | Hoover et al. |
| 10,122,719 B1 | 11/2018 | Vltavsky et al. |
| 10,264,215 B1 | 4/2019 | Sadanand |
| 10,482,664 B1 | 11/2019 | Schlosser et al. |
| 10,558,978 B1* | 2/2020 | Rayudu ............ G06Q 20/40145 |
| 11,037,116 B2 | 6/2021 | Sinha et al. |
| 11,068,968 B2 | 7/2021 | Kuoh et al. |
| 2014/0282162 A1* | 9/2014 | Fein ...................... G06F 3/0486 |
| | | 715/810 |
| 2014/0285522 A1 | 9/2014 | Kim et al. |
| 2015/0206349 A1 | 7/2015 | Rosenthal et al. |
| 2016/0171597 A1 | 6/2016 | Todeschini |
| 2016/0180072 A1 | 6/2016 | Ligatti et al. |
| 2016/0275483 A1 | 9/2016 | Zhou |
| 2016/0300293 A1 | 10/2016 | Nagar |
| 2018/0096529 A1 | 4/2018 | Menard et al. |
| 2018/0108080 A1 | 4/2018 | Kuoh et al. |
| 2018/0121908 A1 | 5/2018 | Lin et al. |
| 2018/0150831 A1 | 5/2018 | Dolan et al. |
| 2018/0189759 A1 | 7/2018 | Bhuiya et al. |
| 2018/0315115 A9 | 11/2018 | Kuoh et al. |
| 2019/0156404 A1 | 5/2019 | Gabriele et al. |
| 2019/0197599 A1 | 6/2019 | Zia et al. |
| 2020/0051080 A1 | 2/2020 | Maheshwari et al. |

* cited by examiner

FIG. 7 though an
PAYMENT TRANSACTIONS USING AN AUGMENTED REALITY DEVICE

RELATED APPLICATION

This application is a continuation of U.S. application Ser. No. 17/348,696, filed Jun. 15, 2021, which is a continuation of U.S. application Ser. No. 15/858,851 filed Dec. 29, 2017, issued as U.S. Pat. No. 11,037,116, on Jun. 15, 2021 and is incorporated herein by reference it its entirety.

FIELD

The embodiments discussed herein are related to systems and methods of performing payment transactions initiated via an augmented reality device.

BACKGROUND

Various augmented reality (AR) systems have recently become available. The devices offer a live direct or indirect view of a real-world environment which is "augmented" or modified with computer-generated or extracted real-world sensory input elements to provide a mixed reality experience. Some types of display systems provide a view through these optics so that the computer-generated elements are displayed or overlaid, to the real-world view. As such, augmented reality is used to enhance or simulate environments and to provide an enriched experience for a user.

With the increase in the number of devices or systems capable of performing AR, there has been a corresponding increase with the number of applications which utilize the new technology. Specifically, although augmented reality was initially used in entertainment or gaming applications, more businesses have developed applications or programs for AR systems.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
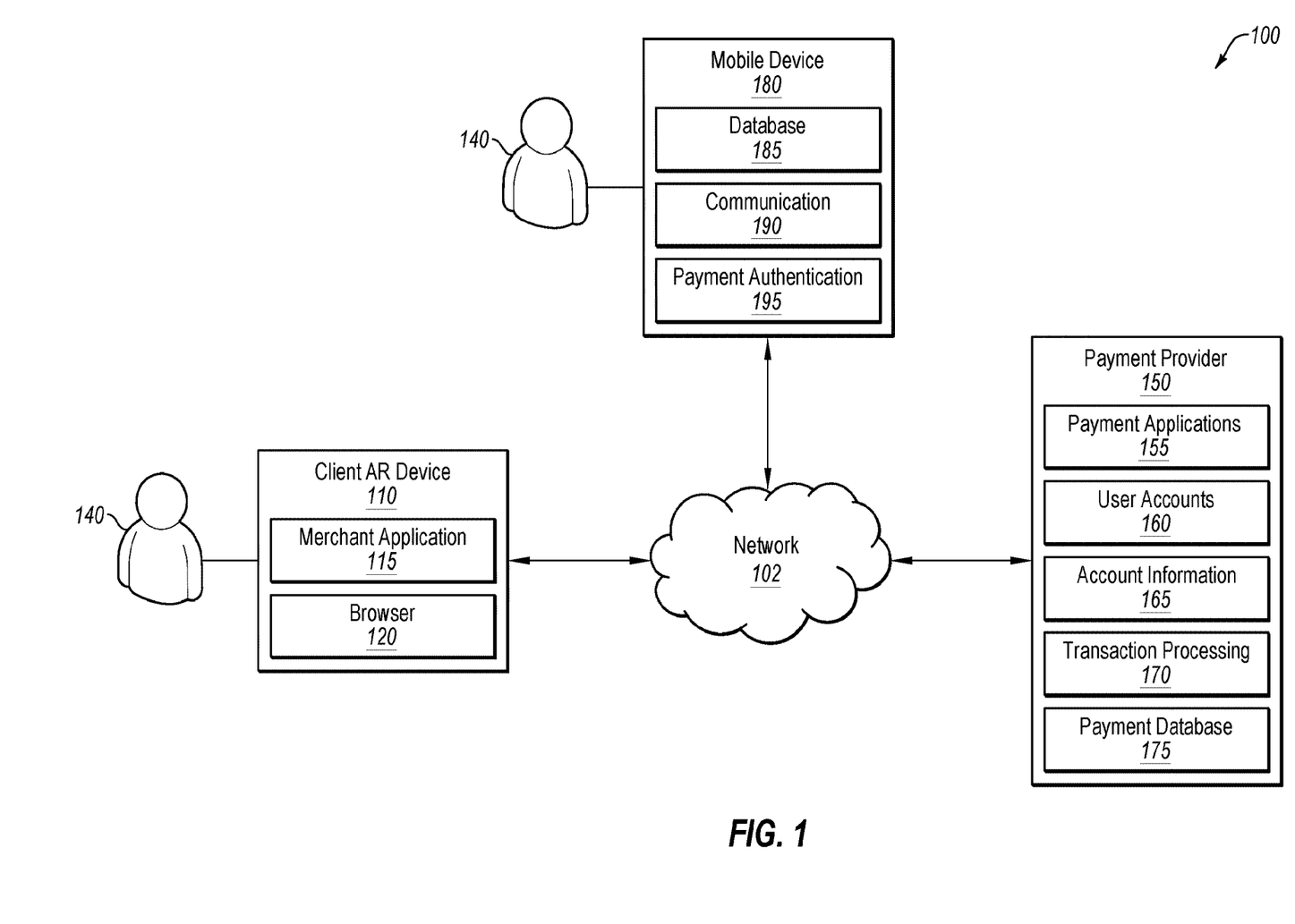
FIG. 1 illustrates an example of a system for performing payment transactions using an augmented reality device according to some embodiments of the present disclosure.

FIG. 1 illustrates a block diagram of a networked system 100 which may be used in making a payment through an augmented reality (AR) device according to some embodiments of the present disclosure. The system 100 includes a client AR device 110, a user electronic device 180, and a payment service provider 150 in communication with the client AR device 110 and the electronic device 180 over a network 102. The payment service provider 150 may be maintained by a payment provider or other financial system, an online bank or payment system that supports money transfers in an online or traditional paper payment system. Alternatively, the payment service provider 150 may be maintained by a combination of service providers in different embodiments.

The network 102, in one embodiment, may be implemented as a single network or a combination of multiple networks. For example, in various embodiments, network 102 may include the cloud, the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

The client AR device 110, in one embodiment is described more fully below, and may be implemented with any appropriate combination of hardware and/or software configured for wired and/or wireless communication over network 102. For example, client AR device 110 may be implemented as an AR device individually owned by a user or as a device owned and operated by a merchant which enables a plurality of users as potential clients to utilize the client AR device 110 in a retail setting. The AR device 110 is in communication with network 102. Specific examples of various client AR devices 110 that may be used in association with the embodiments recited herein are described more fully below but it should be appreciated that, in various embodiments, the client AR device 110 may be referred to as a user device or a customer/client device without departing from the scope of the present disclosure.

The AR client device 110, in one embodiment, may include one or more browser applications 120 which may be used to provide a user interface to permit user 140 to browse information available over network 102. For example, browser application 120 may be implemented as a web browser to view information available over network 102. In one implementation, the browser application 120 comprises a software program, such as a graphical user interface (GUI), executable by a processor that is configured to interface and communicate with merchant services and the payment provider 150 via network 102. In one embodiment, the user 140 is able to access a portal to the payment provider 150 via a web browser which accesses a webpage operated by the payment provider 150 in order to authorize the client AR device for making purchases within a merchant app 115.

As may be understood, a variety of different techniques of providing user authorization via the web browser 120 may be used, including the user 140 providing a user name, password, or other login information to the payment provider 150. Alternatively or in addition, other authentication processes may be performed via the web browser 120 of the client AR device, such as answering a security question, or any other suitable security and/or identity verification that is available via a web browser.

The user 140, through the client AR device 110, may also communicate with payment provider 150 to create an account, enter credit card or other banking information, and to generally enable the process of making payments to a merchant using the merchant app 115.

The client AR device 110, includes a merchant app or application 115, which, in one or more embodiments, may be configured to provide an AR experience to the user 140. As such, the merchant app may use a rendering system or any other suitable system, apparatus, device, application, etc., such as those described more fully below, for presenting augmented reality elements to the user 140 in the AR experience and to enable the user for selecting items for purchase and making payments with payment provider server 150 using a user account of the financial system. In some embodiments, the merchant app 115 may also include a software development kit (SDK) app that may be provided by the payment provider, which can be installed or downloaded into the merchant app 115. The SDK app allows user 140 to make a one-touch payment through the merchant app 115 of the client AR client device 110, without requiring the user 140 to exit the merchant app 115.

In some embodiments, the user 140 may use an additional device, such as a electronic device 180 to perform the user authentication described more fully below. The electronic device 180 may be maintained by one or more wireless service providers offering voice and/or data communication services to the user 140 via a communication unit 190. The communication unit 190 may also be configured to facilitate communications with the payment provider 150 via the network 102. The electronic device 180, may include storage 185 that stores user account information, such as user login information and/or authentication information such as a thumbprint authentication information, facial recognition information, passcodes, passwords, and the like. In some embodiments, this authentication information may be used to provide a payment authentication 195 to the payment provider 150. In some instances, this may be performed via an internet or network browser operating on the electronic device 180. Alternatively, the payment authentication information 195 may be performed via a payment app of the payment provider 150 operating on the electronic device. In some instances the payment app may also enable the user to provide credit card or other banking information or to monitor payments which have been authorized by the user account of the user 140, check balances, or perform other processes of a mobile banking app.

The payment provider 150, in one embodiment, may be maintained by an online payment system, which may provide processing for financial transactions on behalf of user 140 with a merchant. The payment provider 155 includes one or more payment applications 155 which may be configured to interact with the client AR device 110 and/or the electronic device 180 over the network 102 to facilitate the purchase of goods or services, communicate/display information, and make payments by user 140 of the client AR device 110 and as discussed herein.

The payment provider 150 maintains a number of user accounts 160, including a user account described more fully below associated with the user 140 and a merchant account associated with a merchant operating the merchant app 115, each of which may include account information 165 associated with individual users. For example, account information 165 may include financial information of users of devices such as account numbers, passwords, device identifiers, user names, phone numbers, credit card information, bank information, or other financial information which may be used to facilitate payment transactions by and between users, such as user 140 and the merchant. In some embodiments, the payment application 155 may be configured to interact with the electronic device 180 to request payment authentication from the user 140 during a transaction through merchant app 115 for a payment using an account of the user 140, which is associated with the electronic device 180.

A transaction processing application 170, which may be part of payment application 155 or separate, may be configured to receive information from the client AR device 110 and/or electronic device 180 for processing and storage in a payment database 175. Transaction processing application 170 may include one or more applications to process information from user 140 for processing an order and payment as described herein. Payment application 155 may be further configured to determine the existence of and to manage accounts for user 140, as well as create new accounts if necessary, including obtaining user device information, such as a phone number of the electronic device 180 associated with an account.

Figure 2A:
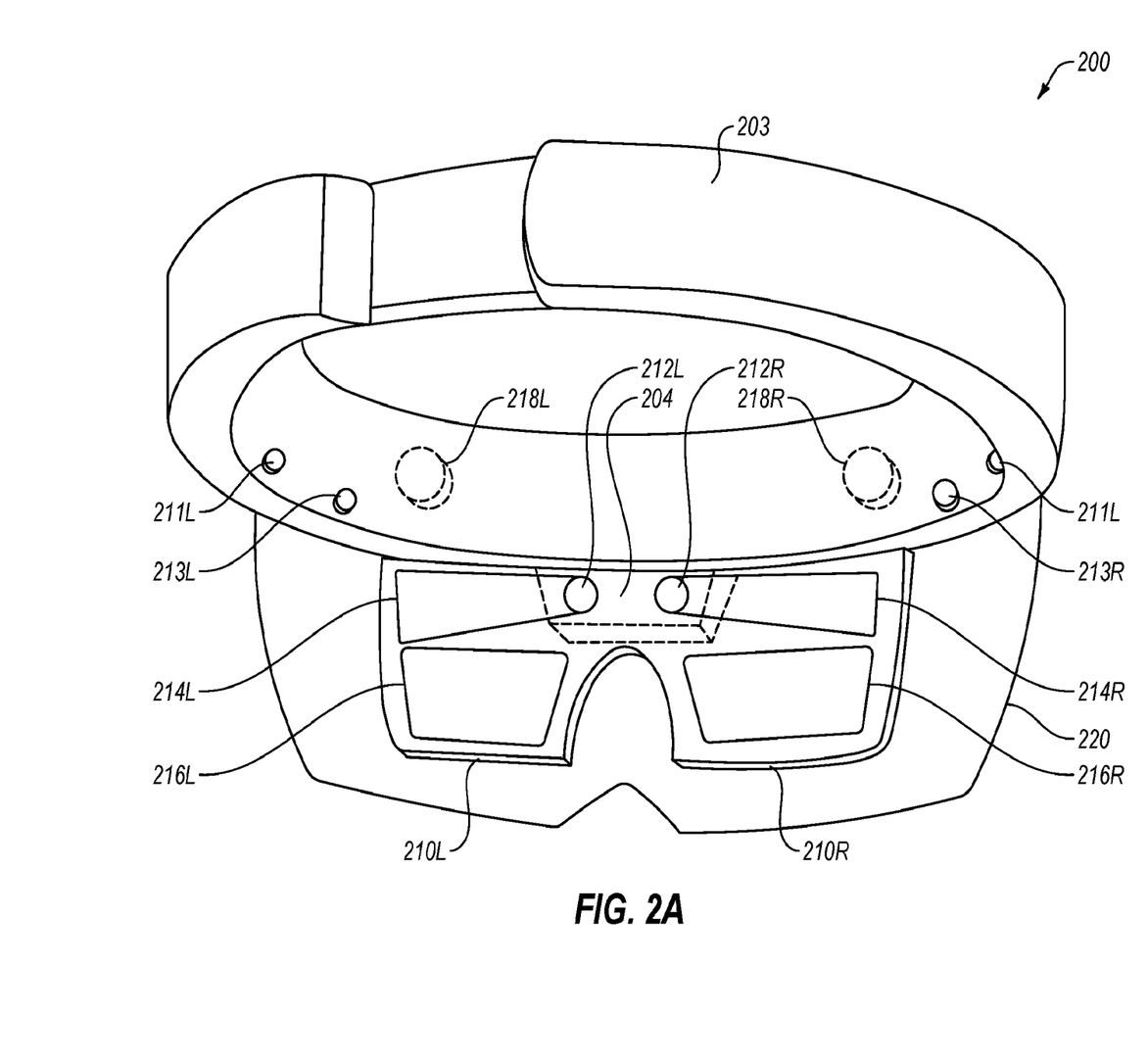
FIG. 2A shows a perspective view of an augmented reality device capable of performing some embodiments of the present disclosure.

FIG. 2A shows a perspective view of a wearable "AR" device 200, which is an example of the client AR device 110 of FIG. 1, from the perspective of a user 140 of the device 200. In this example, FIG. 2A is a MICROSOFT® Hololens augmented reality device, although it should be appreciated that any other suitable augmented reality devices may be used without departing from the scope of the present disclosure. As such, other headpieces are also within the scope of the subject matter. For instance, the display optics can equally be attached to the users head using a frame (in the manner of conventional spectacles), helmet or other fit system.

Figure 2B:
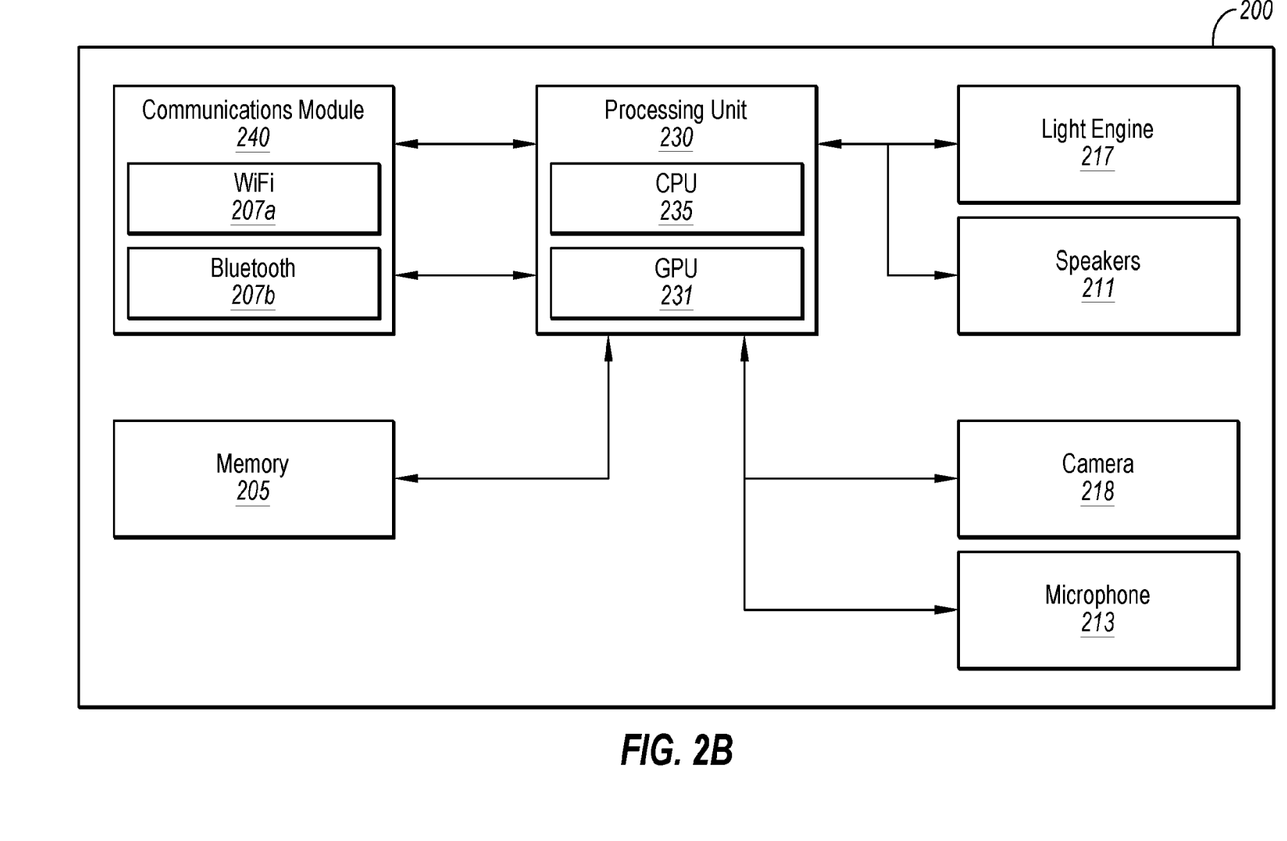
FIG. 2B is a block diagram of the augmented reality device of FIG. 2A.

FIG. 2B shows a schematic block diagram of the AR device 200. The AR device 200 is a computer device in the form of a wearable headset. The user 140 is not shown in FIGS. 2A and 2B, but is depicted in some of the later figures.

The AR device 200 includes a headpiece 203, which is a headband, arranged to be worn on the wearer's head. The headpiece 203 has a central portion 204 intended to fit over the nose bridge of a wearer, and has an inner curvature intended to wrap around the wearer's head above their ears.

The headpiece 203 supports left and right optical components, labelled 210L and 210R, which may be waveguides. For ease of reference herein an optical component 210 may be considered to be either a left or right component, because the components are essentially identical apart from being mirror images of each other. Therefore, all description pertaining to the left-hand component also pertains to the right-hand component. The central portion 204 houses at least one light engine 217, depicted in FIG. 2B.

The light engine 217 comprises a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry which is not visible in FIGS. 2A and 2B which activates individual pixels of the display to generate an image. Substantially collimated light, from each pixel, falls on an exit pupil of the light engine 217. At the exit pupil, the collimated light beams are coupled into each optical component, 210L, 210R into a respective in-coupling zone 212L, 212R provided on each component. In-coupled light is then guided, through a mechanism that involves diffraction and total internal reflection (TIR), laterally of the optical component in a respective intermediate (fold) zone 214L, 214R, and also downward into a respective exit zone 216L, 216R where it exits the component 210 towards the users' eye. The optical component 210 is located between the light engine 217 and the eye i.e. the display system configuration is of so-called transmissive type.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the user 140. In this manner, the optical component 210 projects the displayed image onto the wearer's eye. The optical components 210L, 210R and light engine 217 constitute display apparatus of the AR device 200.

The zones 212, 214, 216 can, for example, be suitably arranged diffractions gratings or holograms. The optical component 210 has a refractive index n which is such that total internal reflection takes place to guide the beam from the light engine along the intermediate expansion zone 214, and down towards the exit zone 216.

The optical component 210 is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye for example from different light engines 217 (i.e. two micro displays) in the central portion 204, or from the same light engine (i.e. one micro display) using suitable optics to split the light output from the single display.

The wearable AR device 200 shown in FIG. 2A is just one example configuration. For instance, where two light-engines are used, these may instead be at separate locations to the right and left of the device (near the wearer's ears). Moreover, whilst in this example, the input beams that form the virtual image are generated by collimating light from the display, an alternative light engine based on so-called scanning can replicate this effect with a single beam, the orientation of which is fast modulated whilst simultaneously modulating its intensity and/or color. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the optical components 210A, 210L though without the need for the zone structures 212, 214, 216.

The AR device 200 also comprises one or more cameras 219—stereo cameras 210L, 210R mounted on the headpiece 203 and configured to capture an approximate view ("field of view") from the user's left and right eyes respectfully in this example. The cameras are located towards either side of the user's head on the headpiece 3, and thus capture images of the scene forward of the device form slightly different perspectives. In combination, the stereo camera's capture a stereoscopic moving image of the real-world environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

As illustrated in FIG. 2B, the AR device 200 may also comprise: one or more loudspeakers 211; one or more microphones 213; memory 205; processing apparatus in the form of one or more processing units 203 (e.g. CPU(s) 235, GPU(s) 237), and/or bespoke processing units optimized for a particular function, such as AR related functions); and one or more computer interfaces or a communications module 240 for communication with other computer devices, such as using a Wifi interface 207a, Bluetooth interface 207b, and the like. The AR device 200 may comprise other components that are not shown, such as dedicated depth sensors, additional interfaces etc.

As illustrated in FIG. 2A, a left microphone 211L and a right microphone 213R are located at the front of the headpiece (from the perspective of the wearer), and left and right channel speakers, earpiece or other audio output transducers are to the left and right of the headpiece 203. These are in the form of a pair of bone conduction audio transducers 2111, 211R may function as left and right audio channel output speakers.

Additionally, although not externally visible, the processing unit 230, memory 205 and interfaces 207a, 207b may be housed in the headpiece 203. Alternatively, these may be housed in a separate housing connected to the components of the headpiece 203 by wired and/or wireless means. For example, the separate housing may be designed to be worn or a belt or to fit in the wearer's pocket, or one or more of these components may be housed in a separate computer device (smartphone, tablet, laptop or desktop computer etc.) which communicates wirelessly with the display and camera apparatus in the AR headset 200, whereby the headset and separate device constitute augmented reality apparatus.

The memory 205 holds executable code that the processing using 230 is configured to execute. In some cases, different parts of the code may be executed by different processing units of the processing unit 230. The code may comprise code of an operating system, as well as code of one or more applications configured to run on the operating system.

Figure 3A:
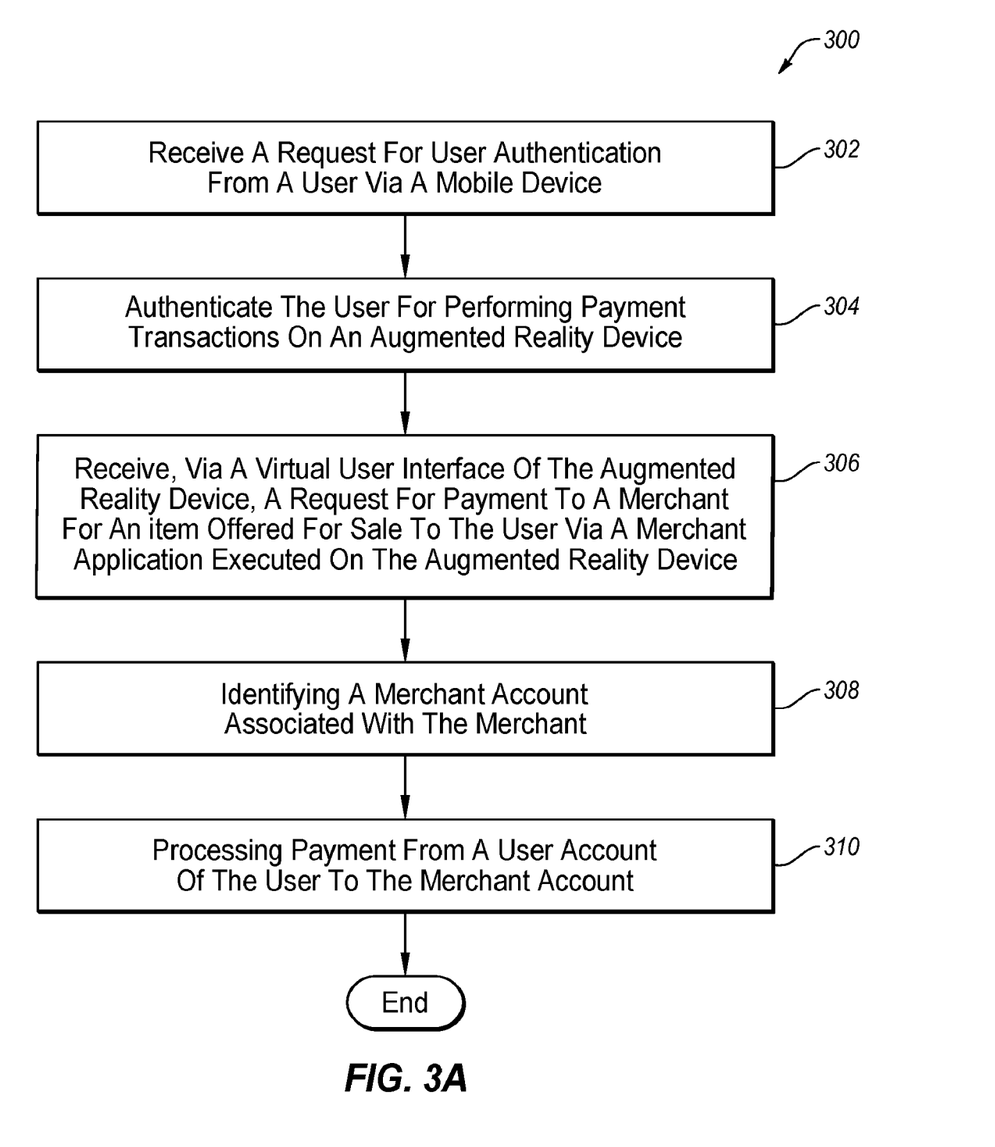
FIG. 3A is a block diagram of a method of performing payment transactions using an augmented reality device according to one embodiment of the present disclosure.

FIG. 3A is a block diagram illustrating a method 300 of performing a payment transaction in an augmented user experience displayed to the user 140 of the client AR device 110 according to one embodiment. In this embodiment, the method begins at 302 in response to the payment provider 150 receiving a request for user authentication from the user 140. The user authentication may include a variety of information including a user identifier uniquely associated with a payment account of the user 140 at the payment provider 150 in addition to a password or other user verification information using a log-in web portal or other website provided by the payment provider 150. In some instances, the user 140 may create a user account at the payment provider during this process, and may select the unique user identifier and provider payment information to the payment provider 150 via the web browser 120.

In response to receiving the request for user authentication, the payment provider 150 may authenticate 304 the user for performing payment transactions on the client AR device 110. In response to the user 140 being authenticated for performing payment transactions on the client AR device 110, the user 140 may interact with the merchant application in an AR experience. During this experience, as is described more fully below, the user 140 may be presented with various items for sale by the merchant enabling the user to browse through the variety of items in an augmented reality experience.

In response to the user 140 selecting an item for purchase, a request for payment is transmitted to the payment provider 150 via the client AR device 110. In some instances, as described above, this request for payment may be transmitted by a software development kit (SDK) installed in or operating in association with the merchant application 115 without the user 140 having to exit the merchant application 115. At 306, the payment provider receives the request for payment to the merchant for the selected item offered for sale to the user 140. The request for payment includes a unique merchant identifier and a payment amount. At 308, the payment provider 150 identifies a merchant account associated with the unique merchant identifier, and at 310 a payment in the payment amount is performed between the payment account of the user and the merchant account.

Figure 3B:
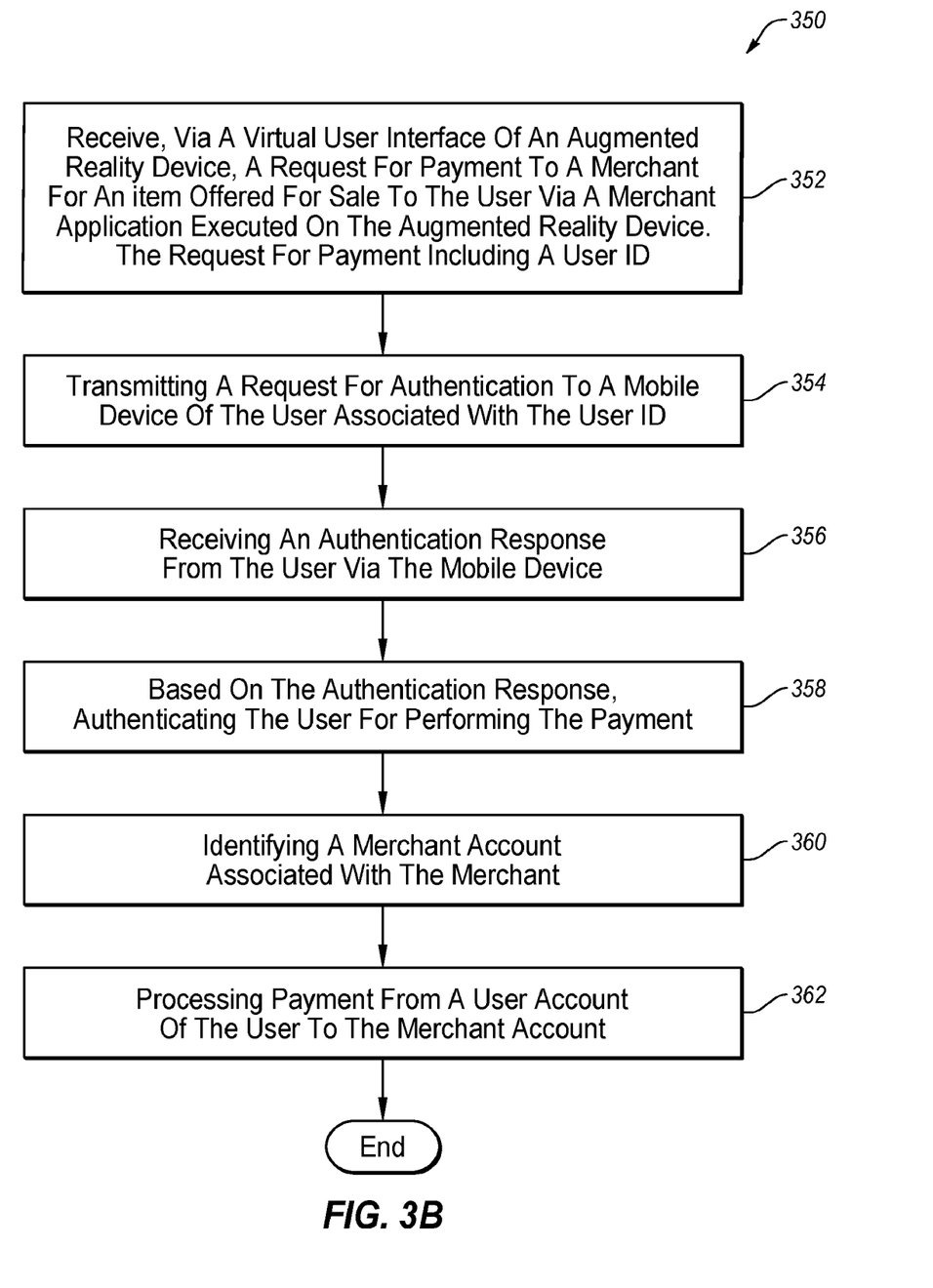
FIG. 3B is a block diagram of another method of performing payment transactions using an augmented reality device according to another embodiment of the present disclosure.

FIG. 3B illustrates an alternative embodiment of a method 350 for performing a payment transaction in an augmented user experience displayed to the user 140 of the client AR device 110. In this embodiment, the user 140 selects items for purchase using the client AR device 110, but performs purchase authentication through a secondary electronic device 180. More particularly, the method begins at 352 in response to the payment provider 150 receiving a request for payment transmitted to the payment provider 150 via the client AR device 110. In some instances, as described above, this request for payment may be transmitted by a software development kit (SDK) installed in or operating in association with the merchant application 115 without requiring the user 140 to exit the merchant application 115. The request for purchase includes the unique user identifier, a unique merchant identifier, and a payment amount.

In response to receiving the payment request, the payment provider 150 transmits a request for authentication to a electronic device 180 associated with a user account associated with the unique user identifier. In some instances, this may involve a notification sent to the electronic device via a text, phone call, notification, email, alert, or communication requesting that the user authenticate the purchase. This authentication may be performed via a number of different mechanisms such as via a thumbprint, authorizing password, passcode, predetermined pattern, text/email response, facial recognition, or the like.

Based on the authentication response being determined to be valid, at 358 the payment provider 150 authenticates the payment. At 360, the payment provider 150 identifies a merchant account associated with the unique merchant identifier, and at 362 a payment in the payment amount is performed between the payment account of the user and the merchant account.

By using multiple devices, the method described in FIG. 3B enables a user to select items for purchase using the AR client device 110 while the user 140 is interacting with the augmented reality and then subsequently or even in some instances simultaneously use another device 180 to easy authorize the payment. Such a mechanism provides the advantages offered by each device without requiring the user 140 to attempt to enter in the authenticating information via the client AR device 110. Additionally, such systems may provide additional security to the users 140 and the ability to monitor the purchase once the AR experience has been completed.

Figure 4:
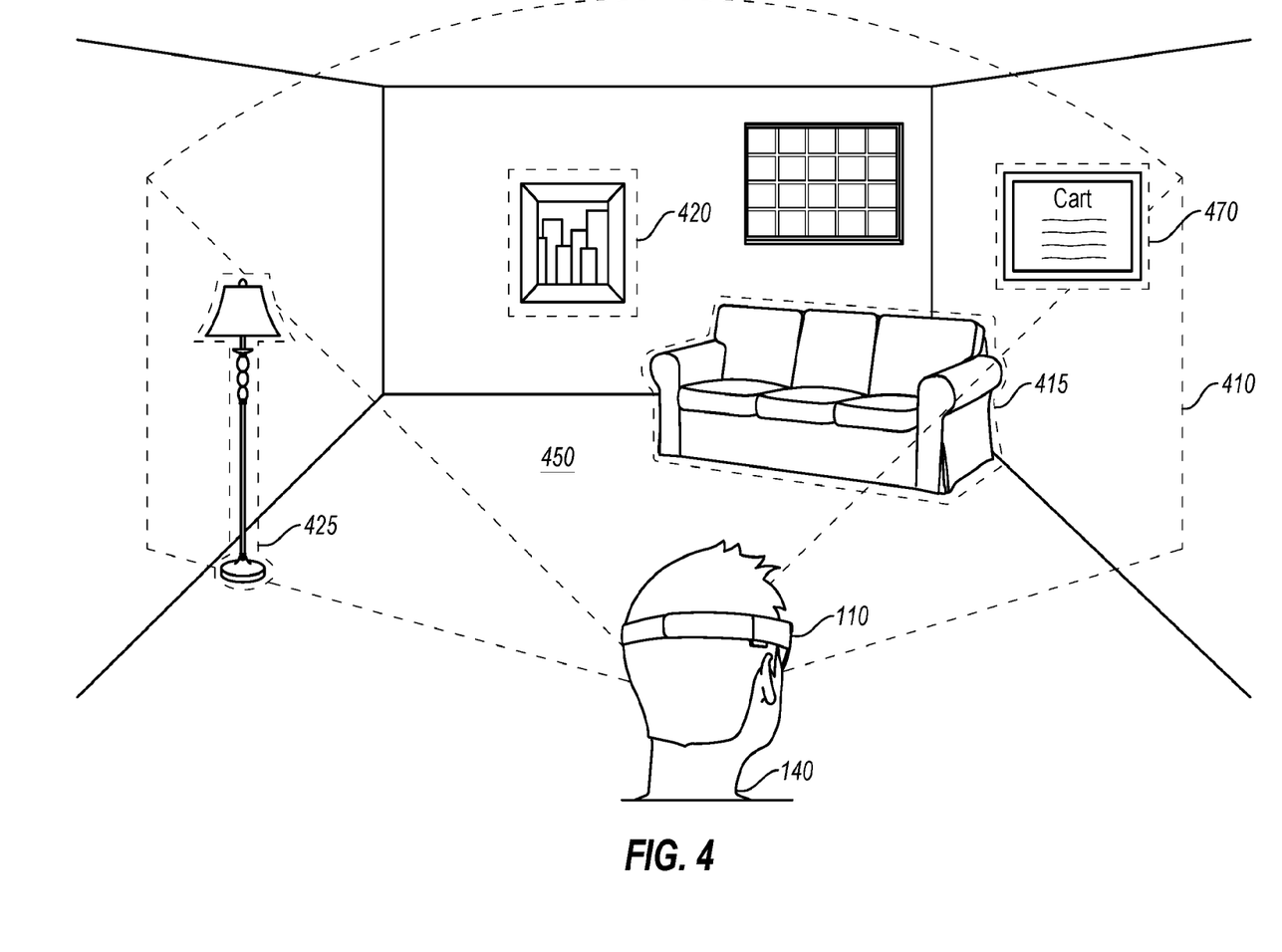
FIG. 4 is a perspective view of an augmented reality experience and use of a merchant application according to one embodiment of the present disclosure.

FIG. 4 is an example of an AR experience 410 which may be presented to the user 140 via a merchant application 115. In this embodiment, the user 140 uses the client AR device 110 to visualize a variety of home furniture that may be offered for sale by a merchant in his or her own physical home or as a simulation in a display room. For example, by using the AR device 110, the user is able to add or remove furniture from a selection of available items to a physical room so as to see a preview or a demonstration of how the furniture would look in his or her own home. In this instance, the user 140 has selected a variety of home furniture, including a couch 415, a lamp 425, and a framed picture 420 which are shown as AR elements projected onto a real-world physical room 450. As the user 140 browses using the merchant app 115, furniture or other items offered for sale may be quickly and easily added, moved, or removed according to the user's preferences, saving the user 140 extensive time and energy that would be involved if the actual physical furniture corresponding to the AR elements were actually physically added, removed, or removed from the user's home or office. As the user 140 interacts with the merchant app 115, items are added to a virtual shopping cart, shown as element 470. As may be understood, any number of gestures or actions may be used in association with the client AR device 110 and merchant app 115 in enabling the user 140 to add, remove, or move the AR elements to the AR experience 110, such as capturing user gestures, audio instructions, and the like.

Figure 5A:
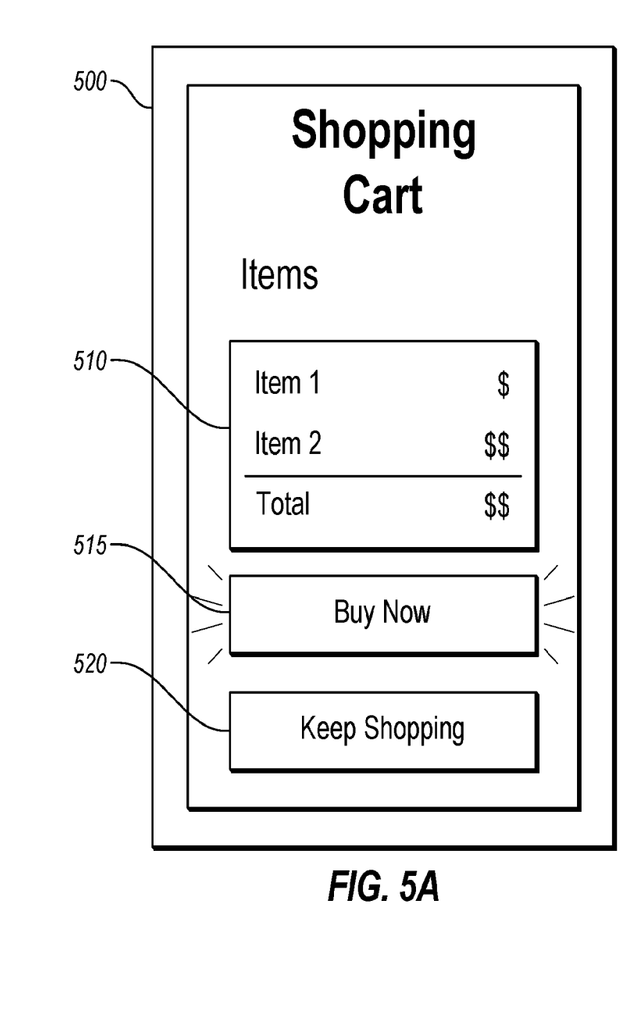
FIGS. 5A-5D are examples of a virtual user interface which may be displayed to a user within a merchant application operating on an augmented reality device according to some embodiments of the present disclosure.

FIGS. 5A-5D show examples of user interface 500 which may be presented to the user 140 via the AR client device 110 to enact the purchase of the items offered for sale which have been selected by the user 140 for purchase. FIG. 5A illustrates a shopping cart 510 that includes a listing of items which have been selected for purchase and a total purchase amount for the sum of the price for each of the selected items. The user interface also includes a "buy now" button, which may be selected to initiate the payment process and a "Keep Shopping" button, which, in response to being selected enables the user 140 to continue shopping via the merchant app 115.

Figure 6A:
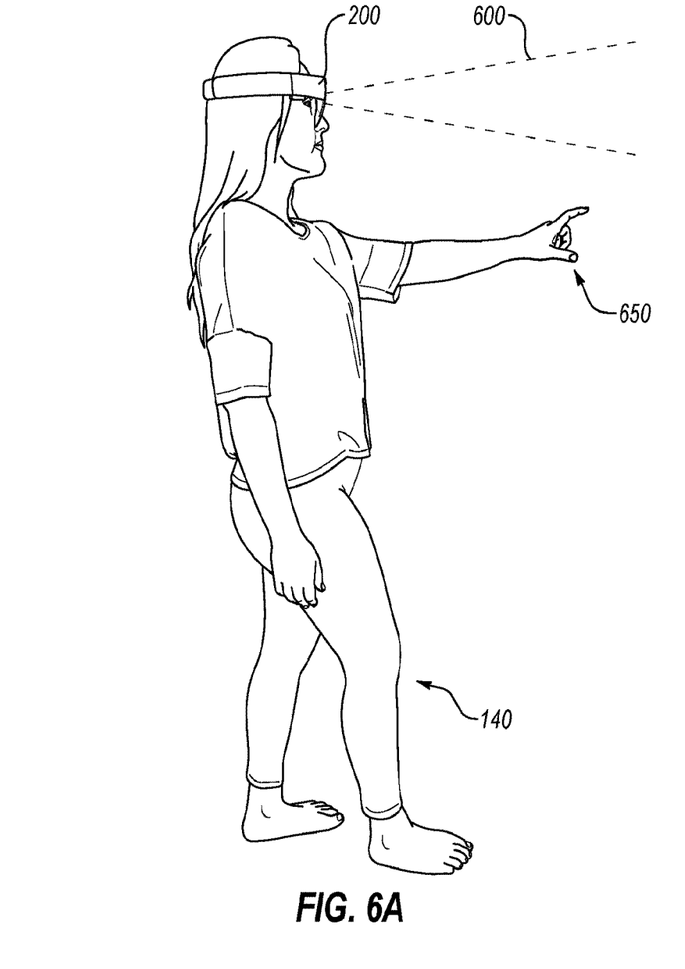
FIGS. 6A-6B illustrate a series of user gestures which may be captured by an augmented reality device in accordance with some embodiments of the present disclosure.
Figure 6B:
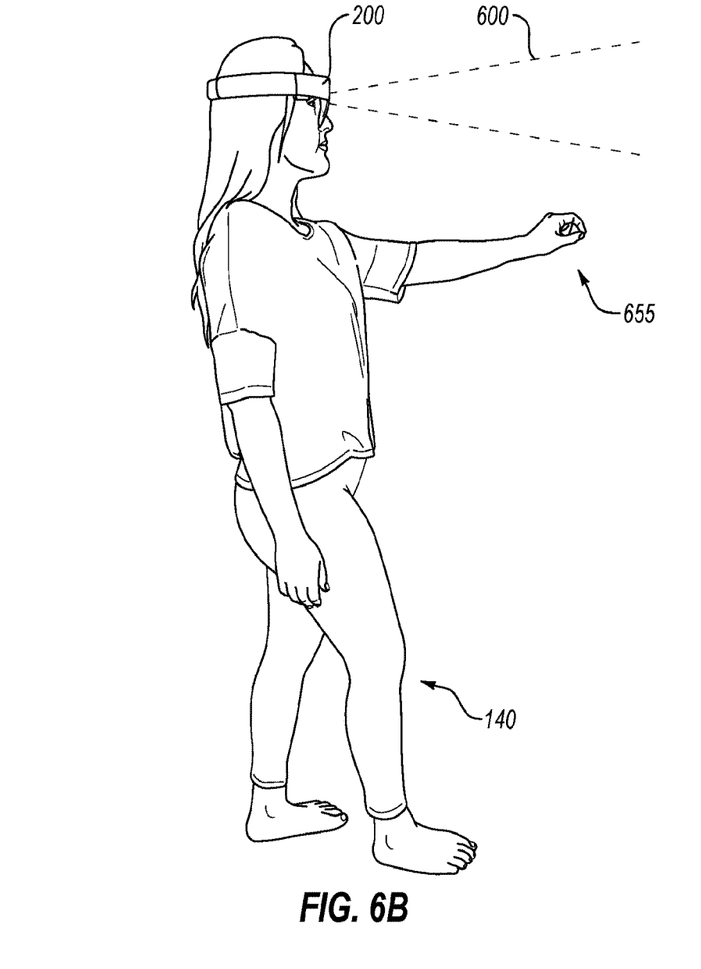

FIGS. 6A-6B illustrate an example of the mechanism for capturing a user gesture in accordance with the client AR device 110. As was previously described above, the AR device 110, shown here as the headset 200 has a series of cameras for capturing user movement as the user interacts in the AR experience 600. More specifically, in this instance, as the user moves his or her arm 650, the client AR device 110 captures the movement via the cameras and then determines that the user is selecting a particular box, window, or other element displayed to the user 140 in the AR experience 600. In FIG. 6B, as the user closes his hand 655, the user is determined to be selecting the box at the location corresponding to the AR element shown to the user 140 in the AR experience 600.

In a similar manner, the client AR device 110 may enable the user 140 to input other information such as the user identifier, password, or the like.

In other embodiments, other means for selection may be used, such as using the microphone client AR device 110 for enabling the user to input information via the microphone, which information is then captured and converted into text or other digital information.

Figure 5B:
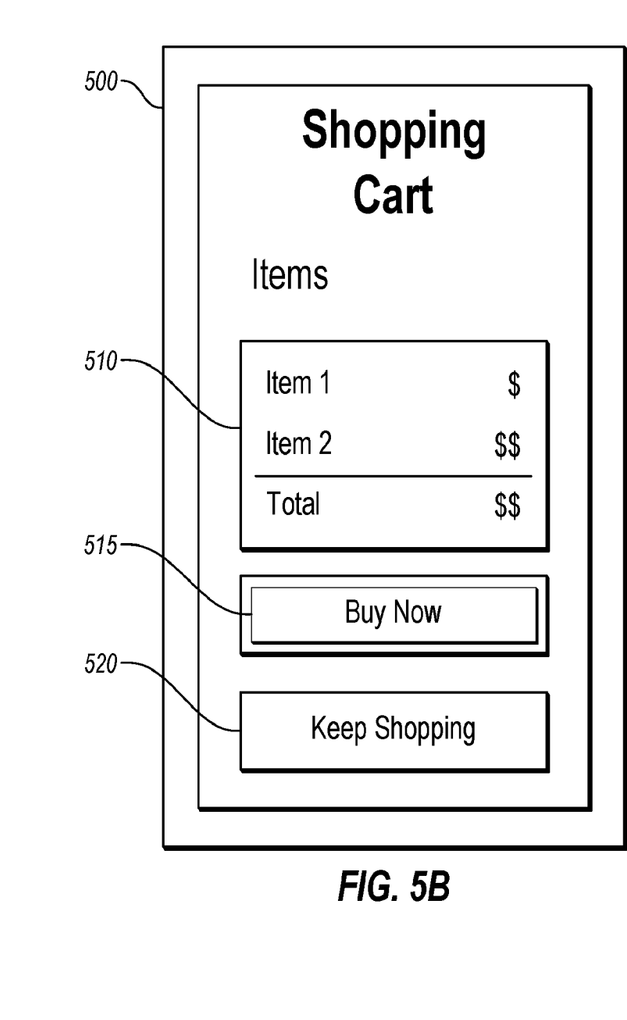

By using this or other selection mechanisms, at FIG. 5B the user is determined to have clicked or selected the "Buy Now" box 515. In response to this selection, the user 140 is then presented with a series of payment options, such as manually entering payment info such as credit card information via the selection of box 530. In some instances, where the user 140 has already authenticated the purchase(s) via the client AR device 110, the user 140 may easily authorize the payment by selecting the "Pay Now" button and no further authorization may be required by the payment provider 150 to process the payment from the user to the merchant. In some instances, the "Pay Now" button 535 may only be displayed to the user 140 after the user has already authorized the client AR device 110 for performing purchases.

Figure 5C:
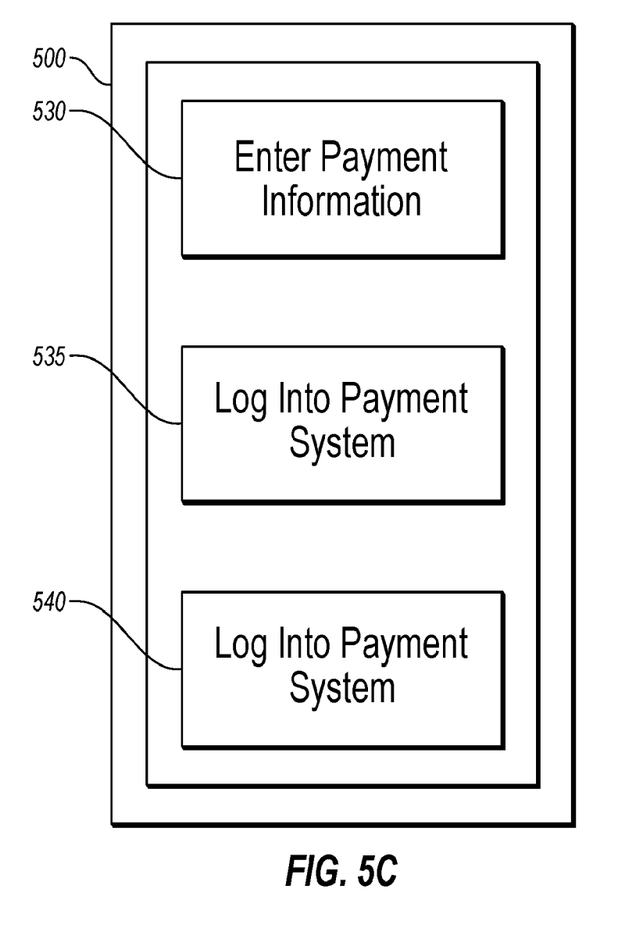
Figure 5D:
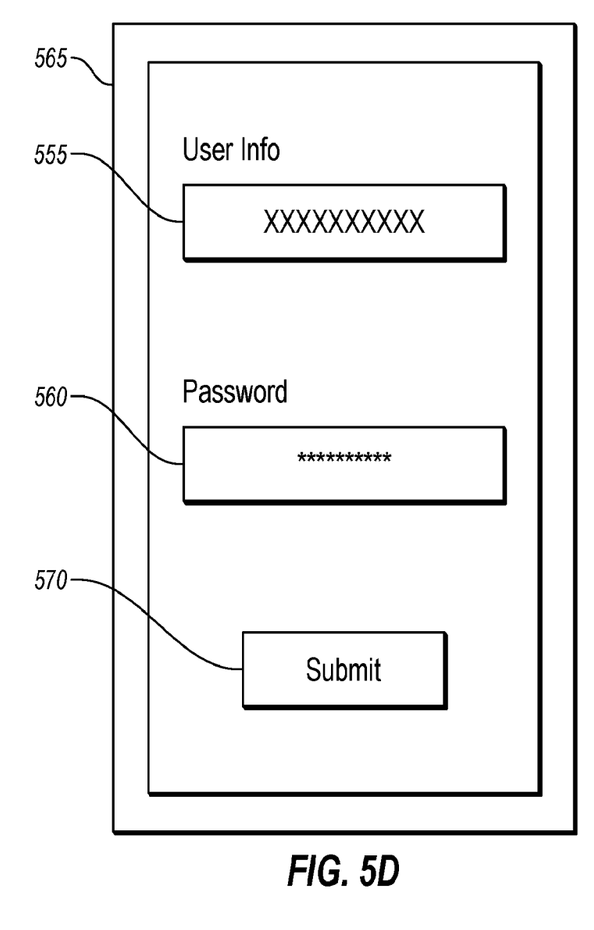

In instances where the user 140 has not previously authorized the client AR device 110 for purchases, the user 140 may log into the payment system by selecting box 540, in response to which the user interface may display screen 565 for enabling the user 140 to enter a user identifier 555 and password 560. As was previously described, this may be performed via an audio response captured by the microphones 213 of the AR device 200, via gestures or movement captured by cameras 218 of the AR device 200 or other input means.

As such, embodiments described herein provide a mechanism which enable the user 140 not only interact with AR elements within an AR experience provided by the AR client 110, but also enable the user 140 to initiate payment for a selection of items while still within the AR experience provided by the merchant app 115. As may be understood, this makes it easier for the user to directly correlate the selection of items with the ability to purchase the items rather than simply providing the user with a physical shopping list of items which the user must then reselect for purchase using an alternate means. Furthermore, this provides a benefit to the merchant providing the merchant app 115 since the improved ease at which users may purchase items results in additional sales and an increased incentive to using the merchant app 115 and client AR device 110.

Figure 7:
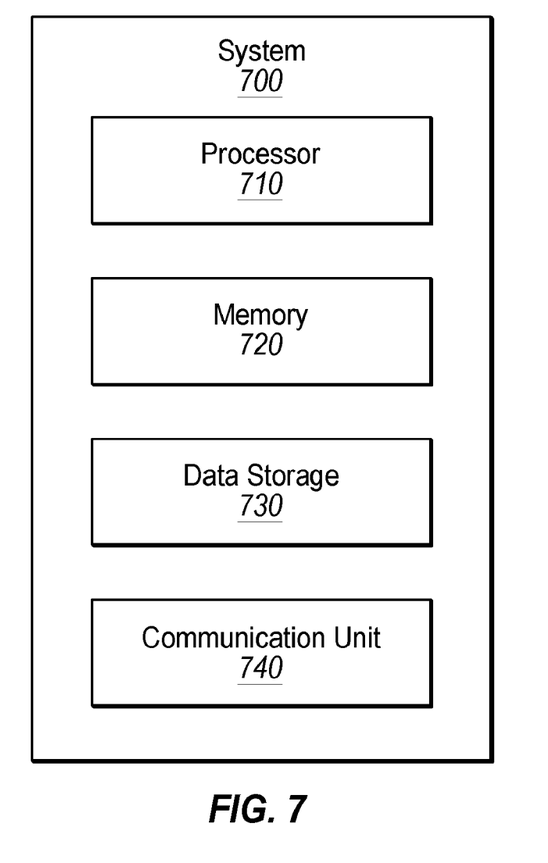
FIG. 7 illustrates an example computing system that may be used in a system configured to provide payments initiated in an augmented reality device.

In association with the embodiments described herein, FIG. 7 illustrates an example computing system 700 ("system 700") that may be used in a system configured to perform purchases made via the client AR device 110, in accordance with one or more embodiments of the present disclosure. The system 700 may include a processor 710, a memory 720, data storage 730, and a communication unit 740, which all may be communicatively coupled. In some embodiments, at least a portion of the system 700 may be part of any of the systems or devices described in this disclosure. For example, For example, the system 700 may be included in or part of the elements 110, 150, and 180 of FIG. 1.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (SIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of networks or physical locations that are configured to perform individually or collectively any number of operations described herein. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions. In these and other embodiments, the payment processing steps of the methods described herein may be stored in the memory 720 and/or the data storage 730 and may be loaded and executed by the processor 710 to perform operations with respect to the AR device based transaction.

The memory 720 and the data storage 730 may include computer-readable storage media or one or more computer-readable storage media for carrying or having computer-executable instructions or data structures stored thereon. Such computer-readable storage media may include any available media that may be accessed by a general-purpose or special-purpose computer, such as the processor 710. By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer Combinations of the above may also be included within the scope of computer-readable storage media. Computer-executable instructions may include, for example, instructions and data configured to cause the processor 710 to perform or control performance of a certain operation or group of operations as describe in this disclosure.

The communication device 740 may include any component, device, system, or combination thereof that is configured to transmit or receive information over a network. In some embodiments, the communication device 740 may communicate with other devices at other locations, the same location, or even other components within the same system. For example, the communication device 740 may include a modem, a network card (wireless or wired), an infrared communication device, a wireless communication device (such as an antenna), and/or chipset (such as a Bluetooth device, near-field communication (NFC) device, an 802.6 device (e.g., Metropolitan Area Network (MAN)), a WiFi device, a WiMax device, cellular communication facilities, etc.), and/or the like. The communication device 740 may permit data to be exchanged with a network and/or any other suitable devices or systems, such as those described in the present disclosure. For example, when the system 700 is included in the devices 110, 150, and/or 180 of FIG. 1, the communication device 740 may allow the devices 110, 150, and/or 180 to communicate with one or more other devices over the network 102 of FIG. 1 and/or other communication avenues.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed, to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e g "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method, comprising:
receiving, by a computer system via a virtual user interface of an augmented reality (AR) device accessed by a user, a request for payment to a merchant for purchasing contents of a virtual reality shopping cart that include an item or service displayed for purchase to the user via a merchant application executed on the AR device, wherein the item or service are displayed via a virtual representation projected on a visual representation of a physical room before receiving purchase input from the user, wherein the request for payment is captured at the AR device based on a purchase gesture of the user performed relative to the virtual representation of the item displayed for purchase, wherein the request for payment includes a user identifier (ID);
transmitting, by the computer system to a mobile device of the user associated with the user ID, a request to authenticate the user;
receiving, by the computer system from the mobile device, an authentication response captured from the user via the mobile device;
authenticating, by the computer system based on the authentication response, the user for performing the request for payment; and processing, by the computer system, the payment from a user account of the user to a merchant account of the merchant.

2. The method of claim 1, wherein the authentication response includes authentication information input by the user via the mobile device.

3. The method of claim 1, wherein the request for payment includes an authentication status that indicates whether the user is previously authenticated at the mobile device of the user for transactions originating at the AR device.

4. The method of claim 1, wherein a confirmation of processing of the payment is communicated to the merchant.

5. The method of claim 1, wherein the user is further authenticated at the mobile device using at least one verification type provided from the user, the verification type comprising one or more of a user biometric, a password, a passcode, and a response to a text message.

6. The method of claim 1, wherein the request for payment comprises a user gesture captured by the AR device during a selection of the virtual representation of the item or service offered for sale to the user in an AR environment displayed by the AR device.

7. The method of claim 1, wherein the request for payment is transmitted from a software development kit (SDK) associated with the merchant application on the AR device.

8. The method of claim 1, wherein during processing of the payment, a certain amount of funds is transferred between the user account of the user and the merchant account.

9. A computer system, comprising:
a non-transitory memory storing instructions; and
a processor configured to execute the instructions to cause the computer system to:
receive, via a virtual user interface of an augmented reality (AR) device accessed by a user, a request for payment to a merchant for purchasing contents of a virtual reality shopping cart that include an item or service displayed for purchase to the user via a merchant application executed on the AR device, wherein the item or service are displayed via a virtual representation projected on a visual representation of a physical room before receiving purchase input from the user, wherein the request for payment is captured at the AR device based on a purchase gesture of the user performed relative to the virtual representation of the item displayed for purchase, wherein the request for payment includes a user identifier (ID);
transmit, to a mobile device of the user associated with the user ID, a request to authenticate the user;
receive, from the mobile device, an authentication response captured from the user via the mobile device;
authenticate, based on the authentication response, the user for performing the request for payment; and
process the payment from a user account of the user to a merchant account of the merchant.

10. The computer system of claim 9, wherein the request for payment includes an authentication status that indicates that the user is not authenticated and that the user requires authentication at one or more of the mobile device and the AR device.

11. The computer system of claim 9, wherein the request for payment includes an authentication status that indicates whether the user is previously authenticated at the mobile device for transactions originating at the AR device.

12. The computer system of claim 9, wherein the user is authenticated at the mobile device using at least one verification type provided from the user, the at least one verification type comprising one or more of a user biometric, a password, a passcode, and a response to a text message.

13. The computer system of claim 9, wherein the instructions further cause the AR device to communicate a confirmation of processing of the payment to the merchant.

14. The computer system of claim 9, wherein the AR device transmits the request for payment from a software development kit (SDK) associated with the merchant application on the AR device.

15. A non-transitory machine-readable medium having instructions stored thereon, the instructions executable to cause a computer system to perform operations comprising:
receiving, via a virtual user interface of an augmented reality (AR) device accessed by a user, a request for payment to a merchant for purchasing contents of a virtual reality shopping cart that include an item or service displayed for purchase to the user via a merchant application executed on the AR device, wherein the item or service are displayed via a virtual representation projected on a visual representation of a physical room before receiving purchase input from the user, wherein the request for payment is captured at the AR device based on a purchase gesture of the user performed relative to the virtual representation of the item displayed for purchase, wherein the request for payment includes a user identifier (ID);
transmitting, to a mobile device of the user associated with the user ID, a request to authenticate the user;
receiving, from the mobile device, an authentication response captured from the user via the mobile device;
authenticating, based on the authentication response, the user for performing the request for payment; and
processing the payment from a user account of the user to a merchant account of the merchant.

16. The non-transitory machine-readable medium of claim 15, wherein the request for payment includes an authentication status that indicates that the user is not authenticated and that the user requires authentication at one or more of the mobile device of the user and the AR device.

17. The non-transitory machine-readable medium of claim 15, wherein the request for payment includes an authentication status that indicates whether the user is previously authenticated at the mobile device of the user for transactions originating at the AR device.

18. The non-transitory machine-readable medium of claim 15, wherein the operations further comprise communicating a confirmation of the authentication of the request for payment to the merchant to indicate processing of the payment.

19. The non-transitory machine-readable medium of claim 15, wherein a confirmation of processing of the payment is communicated to the merchant.

20. The non-transitory machine-readable medium of claim 15, wherein during processing of the payment, a certain amount of funds is transferred between the user account of the user and the merchant account.

\* \* \* \* \*